May 4, 1948.　　　　A. E. HOUSE　　　　2,440,823
HINGED JOINT
Filed Aug. 23, 1944
Fig. 1.
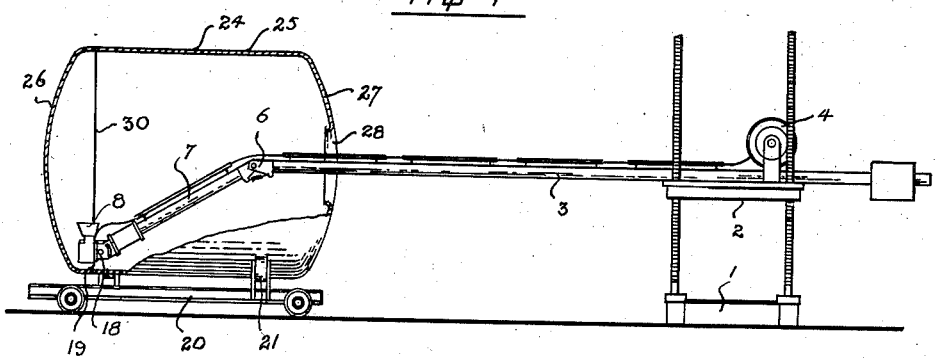
Fig. 3.
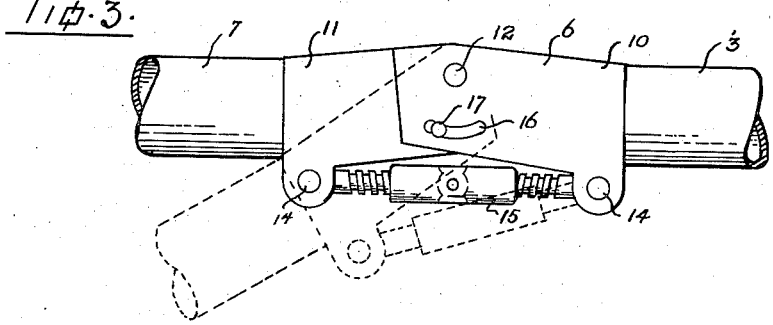
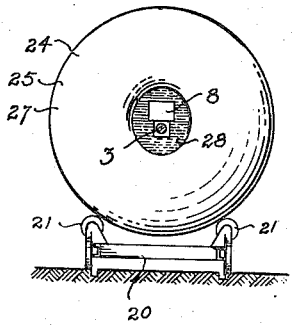
Fig. 2.
INVENTOR
ALBERT ERNEST HOUSE
Ernest E Carver
ATTORNEY Patented May 4, 1948

2,440,823

UNITED STATES PATENT OFFICE 2,440,823

HINGED JOINT

Albert Ernest House, West Vancouver, British Columbia, Canada

Application August 23, 1944, Serial No. 550,724

1 Claim. (Cl. 287—99)

My invention relates to improvements in welding equipment, the object of which is to provide means by which the final girth seam of substantially cylindrical vessels may be automatically welded.

Automatic welding of large cylindrical vessels having end closures in which the manhole is substantially central of one of the end closures are usually made up in two sections, each consisting of one or more cylindrical portions and an end closure. In such cases the inside girth seams are made by automatic equipment which is inserted into the section from its full open end, two such sections are then placed together and are hand welded on the inside by a welder who is within the vessel and is subjected to all the fumes resulting from his operation. The result of hand work in very confined quarters, smoke and fumes, usually is that the seam on being tested by X-ray is defective, necessitating the chipping out of portions of the seam and again welding by the same uncertain means. In view of this situation, the final girth seam operation causes the cost of production of the vessel to be high and involves much greater production time than a fully automatically welded vessel would take.

The use of automatic welding equipment for welding the final closing seam has been impossible because the welding machine after being inserted through the manhole, could not be lowered sufficiently to allow the welding rod to contact the peripheral wall of the vessel and allow the vessel to be rotated to pass the seam under the rod as the weld progressed.

It is with the object of overcoming these difficulties that the present invention is developed.

Referring to the drawings:

Fig. 1 is a general view of the invention.

Fig. 2 is an end view of a vessel in position for a welding head to enter the manhole.

Fig. 3 is a side elevational view of the boom joint.

In the drawings like characters of reference indicate corresponding parts in each figure.

The numeral 1 indicates generally a hoist having a vertically movable platform 2, upon which is supported a horizontal boom 3 and preferably a reel 4 for the purpose of supporting the welding rod or wire.

The boom 3 is preferably of heavy pipe construction and is fitted with a horizontal joint 6 which connects with a boom extension 7 having at its free end a welding machine 8. The joint 6 consists of pairs of side plates 10 and 11, one only of each pair shown, which are connected together with a hinge pin 12, see Figure 3. The lower outer corners of the side plates are connected together by pins 14 between which a right and left hand eyebolt and nut assembly 15 is mounted which is used to adjust the angularity of the plates and the angularity between the boom 3 and the boom extension 7. One of the plates 10 is provided with an arcuate slot 16 which is concentric to the hinge pin 12, a set screw 17 is set in the slot and enters the adjacent plate 11 to lock the hinge in any adjusted position.

The welding machine 8 is mounted upon a horizontal pivot 18 to permit it to be adjusted to present its welding rod 19 in substantially vertical position to the seam.

The numeral 20 indicates a carriage movable longitudinally of the boom 3, which carriage is provided with rollers 21 to support the cylindrical work to be welded.

The vessel shown in Figures 1 and 2 and indicated by the numeral 24 is a short cylindrical body 25 having end closures 26 and 27. The end closure 27 is provided with an elliptical manhole 28 which is large enough when its major axis is in vertical position to permit the welding machine 8 to pass through it and be tilted to working position. The vessel would normally have its closure 27 previously welded in position and with the closure 26 tacked in position prior to the operation shown in this application. The vessel would be moved upon the carriage 20 to permit the machine 8 and a portion of the boom extension 7 to pass therethrough. When the machine is in approximate position lengthwise of the vessel, the boom extension is lowered by the right and left hand eyebolt and nut assembly 15 and adjusted so that the welding rod 19 is properly aligned with the final girth seam 30 to be welded. The arc is then started and the vessel rotated in the usual way to weld the seam between the cylindrical body 25 and the end closure 26. The final girth seam being thus welded by the same equipment as all other girth seams and done in the same manner will produce a vessel whereby every seam is identical as to work and strength.

What I claim as my invention is:

In a vertically movable horizontal boom, a hinged joint comprising a pair of plates secured to opposite sides of one boom member and a second pair of plates secured to opposite sides of a second boom member, the first pair of plates being hingedly connected to the second pair adjacent the upper edges of said plates, a transversely disposed pin connecting each pair of plates together and a turnbuckle connecting said pins together.

ALBERT ERNEST HOUSE.

(References on following page)

REFERENCES CITED

The following references are of record in the file of this patent:

UNITED STATES PATENTS

| Number | Name | Date |
|---|---|---|
| 1,068,721 | Whitford | July 29, 1913 |
| 1,233,452 | Davis | July 17, 1917 |
| 1,550,651 | Charter | Aug. 18, 1925 |
| 1,578,917 | Pierce | Mar. 30, 1926 |
| 1,613,326 | Krebs | Jan. 4, 1927 |
| 1,826,164 | Carrier | Oct. 6, 1931 |
| 1,831,343 | Caldwell | Nov. 10, 1931 |
| 2,096,171 | George | Oct. 19, 1937 |
| 2,174,927 | Moore | Oct. 3, 1939 |